(12) United States Patent
Adam

(10) Patent No.: US 12,157,687 B2
(45) Date of Patent: Dec. 3, 2024

(54) NON-CRYSTALLINE IRON-PHOSPHATE NANOPARTICLES FOR REMEDIATING TOXIC HEAVY METALS AND RADIONUCLIDES

(71) Applicant: Nadia Adam, South Bend, IN (US)

(72) Inventor: Nadia Adam, South Bend, IN (US)

(73) Assignee: Biomineral Systems LLC, South Bend, IN (US)

( * ) Notice: Subject to any disclaimer, the term of this patent is extended or adjusted under 35 U.S.C. 154(b) by 38 days.

(21) Appl. No.: 14/803,357

(22) Filed: Jul. 20, 2015

(65) Prior Publication Data
US 2023/0047467 A1    Feb. 16, 2023

(51) Int. Cl.
| | | |
|---|---|---|
| *C02F 1/62* | (2023.01) | |
| *B09C 1/08* | (2006.01) | |
| *C02F 101/00* | (2006.01) | |
| *C02F 101/20* | (2006.01) | |

(52) U.S. Cl.
CPC .............. *C02F 1/62* (2013.01); *B09C 1/08* (2013.01); *B09C 2101/00* (2013.01); *C02F 2101/006* (2013.01); *C02F 2101/20* (2013.01); *C02F 2305/08* (2013.01)

(58) Field of Classification Search
CPC .. C02F 1/62; C02F 2101/006; C02F 2101/20; C02F 2305/08; B09C 1/08; B09C 2101/00
USPC ................................................. 210/688, 749
See application file for complete search history.

(56) References Cited

U.S. PATENT DOCUMENTS

| | | | |
|---|---|---|---|
| 7,581,902 B2 * | 9/2009 | Zhao ...................... | B82Y 30/00 |
| | | | 405/128.45 |
| 2012/0141602 A1 * | 6/2012 | Escolano ................ | A61P 37/00 |
| | | | 977/773 |
| 2015/0203354 A1 * | 7/2015 | Song ....................... | B82Y 30/00 |
| | | | 423/305 |

FOREIGN PATENT DOCUMENTS

WO    WO-2014025126 A1 *  2/2014 ............. B82Y 30/00

OTHER PUBLICATIONS

Xu, Remediation of Cd(II)-contaminated soil by three kinds of ferrous phosphate nanoparticles (Year: 2016).*

* cited by examiner

*Primary Examiner* — Ekandra S. Miller-Cruz

(57) ABSTRACT

Novel iron-phosphate nanoparticles have been synthesized here. These are less than 12 nanometers in dimension. They are deemed useful for remediation of heavy metals and radionuclides and can be applied to insitu remediation of contaminated soils and contaminated waters.

2 Claims, 4 Drawing Sheets

NON-CRYSTALLINE IRON-PHOSPHATE NANOPARTICLES FOR REMEDIATING TOXIC HEAVY METALS AND RADIONUCLIDES

CROSS REFERENCE TO RELATED APPLICATION

This application claims the benefit of provisional patent application 62/023,945

STATEMENT REGARDING FEDERALLY SPONSORED RESEARCH OR DEVELOPMENT

Partial federal funding was used to support product development

BACKGROUND OF THE INVENTION

(1) Field of the Invention

The purported invention has to do with use of nanoparticles in remediation.

(2) Description of the Related Art

Soils at current or previously mined and smelter sites normally contain higher concentrations of heavy metals such as Pb, Cu, Cd, and Hg exceeding the current regulatory levels (Diawara et al., 2006).

Engineered nanoparticles have been found to offer great promise for remediation of contaminated soils and groundwater (Karn et al., 2009).

General mechanisms of remediation using engineered nanoparticles are induction of various sorption processes (e.g., adsorption to $Fe_2O_3$ nanoparticles), reductive immobilization (e.g., EZVI for reduction of chlorinated solvents), or surface precipitation of new contaminant phases with much reduced mobility.

Surface precipitation of new contaminant phases include Pb immobilization via addition of apatite resulting in precipitation of recalcitrant pyromorphite (Kumpiene et al., 2008; Knox et al., 2006).

Phosphate can effectively capture metal cations including those of heavy metal contaminants, and phosphate-metal precipitates are typically very stable over a wide range of environmental conditions (Knox et al., 2006).

Therefore, metal-phosphate nanoparticles hold promise for effective remediation of contaminated sites.

Metal-phosphate nanoparticles have not been investigated with the exception of recent nano-remediation work by researchers Liu and Zhao, (2007a and 2007b).

Their iron phosphate (vivianite) nanoparticles particles showed reduced Cu(II) leachability by 63-87% and its bioaccessibility in acid, alkaline, and neutral soils after amendment for 56 days (Liu and Zhao, 2007a).

Vivianite nanoparticles were similarly shown to be effective with Hg, and Pb remediation (Liu and Zhao, 2007b; U.S. Pat. No. 7,581,902).

The effect of vivianite nanoparticles was examined only one metal at a time. Soils are contaminated with multiple metals and metal interactive effects can alter remediation efficacy. For example, in As and Pb contaminated soils, Fe and $PO_4$ application affected the mobility of As and Pb in opposite ways (Cui et al., 2010).

BRIEF SUMMARY OF THE INVENTION

Here we have synthesized novel iron-phosphate nanoparticles. They are useful for remediating toxic heavy metals including but not limited to Pb(II), Cu(II), Cd(II), Hg(II), radionuclides, Cr(VI), and As(V).

DETAILED DESCRIPTION OF THE INVENTION

Here we have synthesized novel nanoparticles.

We have characterized them as iron-phosphate nanoparticles.

Our novel non-xl $FePO_4$ nanoparticles are smaller than Liu and Zhao's 8.4±2.9 nm size (2007a and 2007b) vivianite. We expect our nanoparticles to be more effective in remediation.

In lab tests we have shown them to be effective in remediation heavy metals.

Example 1: Synthesis of Novel Iron-Phosphate Nanoparticles

Prepare 250 ml of 0.5 M ferric-nitrate.$9H_2O$ and 250 ml of 0.5 M $KH_2PO_4$ in PP volumetric flasks using millipore water. Combine the two solutions while stirring and immediately adjust pH to 3.2 with 4.5 M KOH and then 0.5 M KOH. The suspension is aged for 42 hrs at 99 degree C. in a dry air oven. After 42 hrs, aging, remove the suspension from the oven and wash three times with water to remove salts.

Example 2: TEM Micrographs of Iron-Phosphate Nanoparticles

Figure 1:
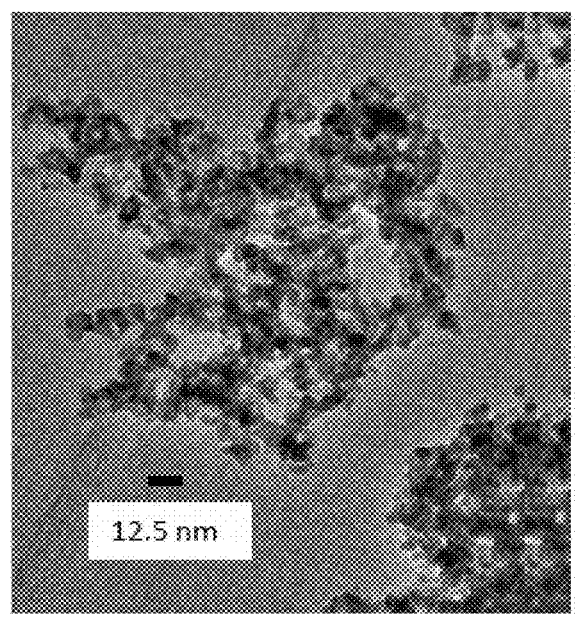
FIG. 1: Transmission electron micrographs of non-crystalline iron-phosphate nanoparticles

The aggregated nano-particles measure roughly 10-12 nm in size with individual nanoparticles likely smaller than stabilized vivianite nanoparticles (see TEM micrograph, FIG. 1).

Example 3: Remediation of Cu(II), Pb(II), Cd(II), and Hg(II) Contaminated Water Using Iron-Phosphate Nanoparticles in the Presence and Absence of Common Soil Ligands Nitrate salts of heavy metals were added to pH adjusted (4.0-8.0) fixed suspension volumes (30 ml) containing 1.5 g/L non-xl $FePO_4$ nanoparticles in 10 mM KCl while stirring at moderate speeds. At pH 6, commonly available ligands, citrate (1 mM), and siderophores (0.25 mM desferrioxaine B) were also added. Total sample volume was 30 ml to allow for sufficient volumes of supernatant for ICP analyses. Controls comprised nanoparticles alone in the absence of heavy metals. Representative samples were withdrawn at 24, and 336 hrs and centrifuged and concentration of dissolved heavy metal contaminants was measured in supernatants to assess reduction in leachability from the soil solution phase. The ligand concentrations are based on the concentrations commonly found in soils.

Figure 2:
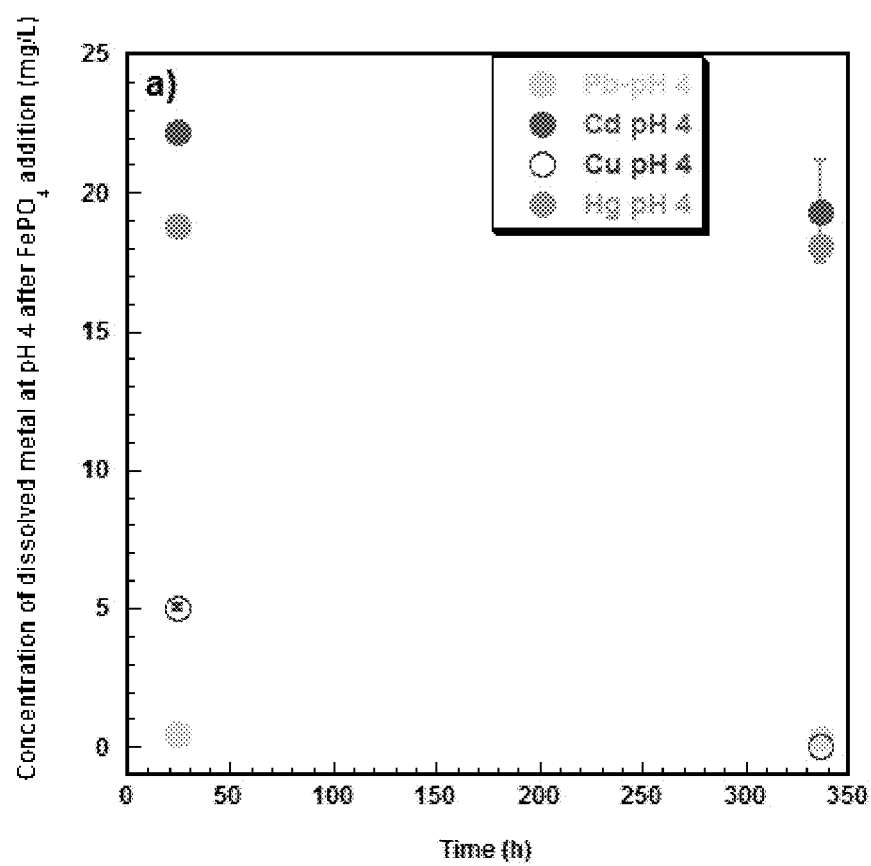
FIG. 2: Initial concentration of Pb, Cd, Cu, and Hg were 207 mg/L, 112 mg/L, 63 mg/L, and 200 mg/L, respectively. Concentration of dissolved metals (Pb, Cd, Cu, and Hg) in mg/L after addition of $FePO_4$ nanoparticles as a function of time at pH 4
Figure 3:
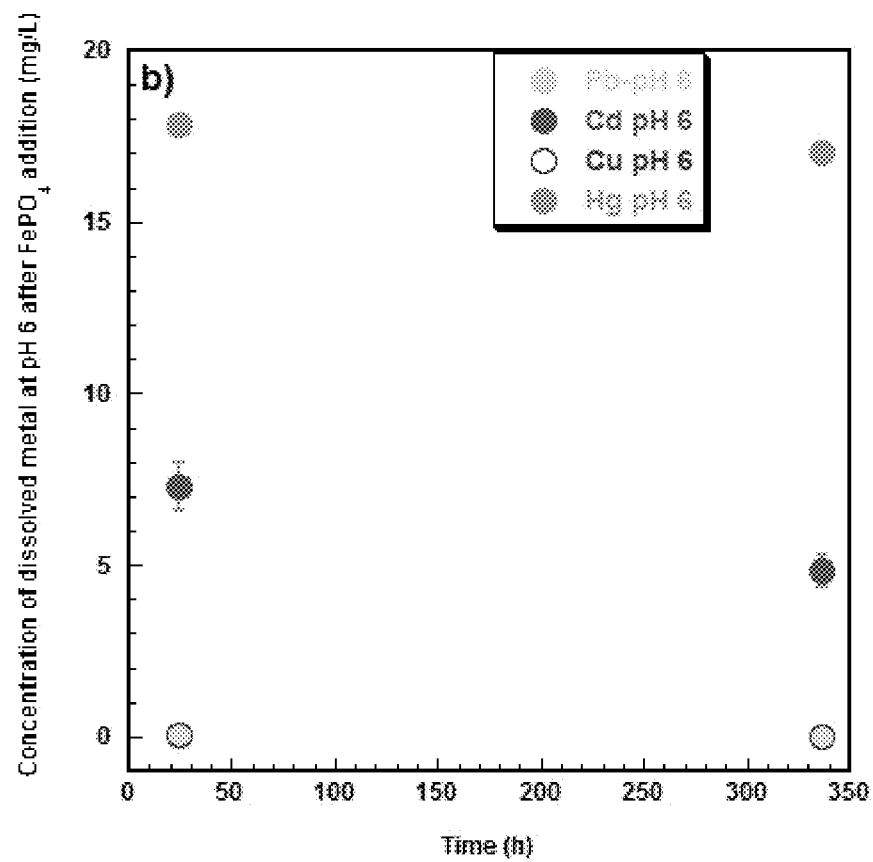
FIG. 3: Initial concentration of Pb, Cd, Cu, and Hg were 207 mg/L, 112 mg/L, 63 mg/L, and 200 mg/L, respectively. Concentration of dissolved metals (Pb, Cd, Cu, and Hg) in mg/L after addition of $FePO_4$ nanoparticles as a function of time at pH 6
Figure 4:
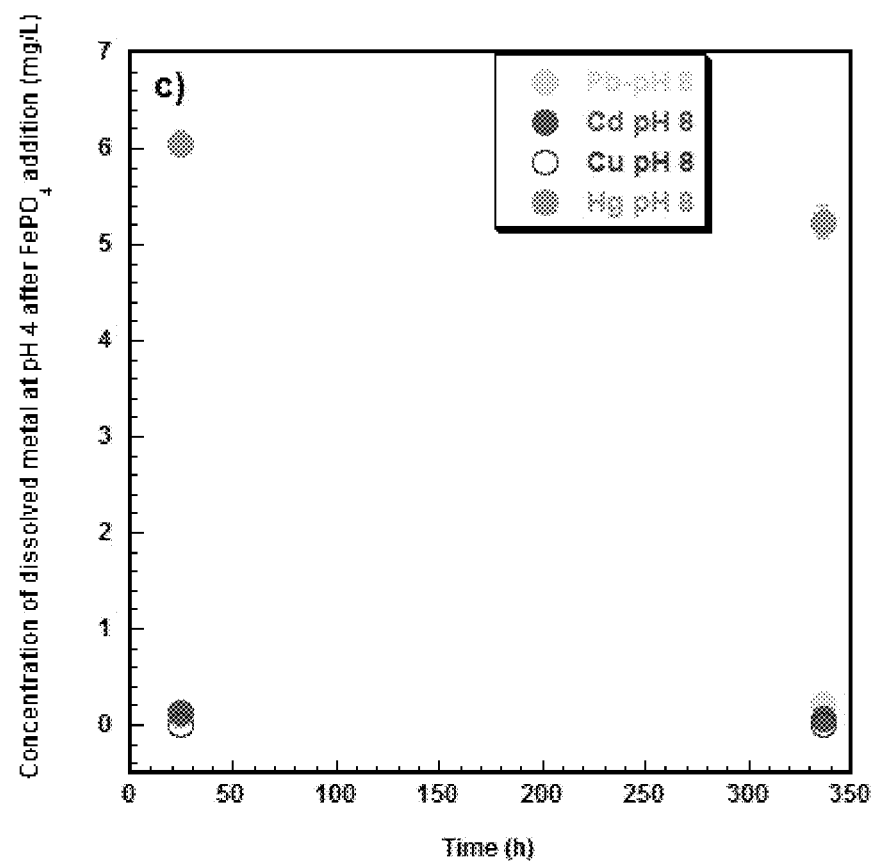
FIG. 4: Initial concentration of Pb, Cd, Cu, and Hg were 207 mg/L, 112 mg/L, 63 mg/L, and 200 mg/L, respectively. Concentration of dissolved metals (Pb, Cd, Cu, and Hg) in mg/L after addition of $FePO_4$ nanoparticles as a function of time at pH 8

The addition of $FePO_4$ nanoparticles was successful in reducing the concentration of all dissolved metals irrespective of pH (FIGS. 2, 3, and 4). However, remediation efficacy of $FePO_4$ nanoparticles was metal and pH dependent (FIGS. 2, 3, and 4). $FePO_4$ was most effective in remediating Pb, and Cu reducing their respective concentration to zero (FIGS. 2, 3, and 4). In addition, $FePO_4$ nanoparticles were most effective in remediating heavy metals at alkaline pH (FIG. 4). In the presence of ligands, citrate and DFO-B at near neutral pH of 6, $FePO_4$ nanoparticles were completely successful in remediating all the metals reducing their concentration to zero at 24 hr, and maintaining it to 336 hr.

Based on the above, we expect FePO4 nanoparticles to be similarly effective in remediating radionuclides.

REFERENCES

Cui Y. S., Du X, Weng LP, et al., 2010. Assessment of In Situ Immobilization of Lead (Pb) and Arsenic (As) in Contaminated Soils with Phosphate and Iron: Solubility and Bioaccessibility. Water Air and Soil Pollution, 213: 95-104.

Diawara, M. B., Litt, J. S., Unis, D., Alfonso, N., Martinez, L., Crock, J. G., Smith, D. B., and Carsella, J., 2006. Arsenic, Cadmium, Lead, and Mercury in surface soils, Pueblo, Colo.: implications for population health risk. Environmental Geochemistry and Health, 28:297315.

Kumpiene J, Lagerkvist A, Maurice C, 2008. Stabilization of As, Cr, Cu, Pb and Zn in soil using amendments-A review. Waste Management, 28:215-225.

Karn B, Kuiken T, Otto M, 2009. Nanotechnology and in Situ Remediation: A Review of the Benefits and Potential Risks. Environmental Health Perspectives, 117: 1823-1831.

Knox A. S., Paller M. H., Nelson E. A., Specht W. L., Halverson N. V., Gladden J. B., 2006. Metal distribution and stability in constructed wetland sediment. Journal of Environmental Quality, 35:1948-1959.

Liu, R., and Zhao, D., 2007a. Insitu immobilization of Cu(II) in soils using a new class of iron phosphate nanoparticles. Chemosphere, 68:1867-1876.

Liu, R., and Zhao, D., 2007b. Reducing leachability and bioaccessibility of lead in soils using a new class of stabilized iron phosphate nanoparticles. Water Research, 41:2491-2502.

What is claimed is:

1. A nanoparticle composition essentially consisting of:
   nanoparticles having an aggregated particle size of 10-12 nm, individual particle size of less than 8 nm; and iron and phosphate in the ratio of 1:1;
   wherein the nanoparticle composition has a non-crystalline structure; and
   wherein the nanoparticle composition is capable of remediating heavy metals and radionuclides in contaminated water and soil in the presence and absence of soil ligands including citrate and siderophores; and
   wherein the heavy metals are selected from the group consisting of Lead (Pb(II), Cadmium (Cd(II), Copper (Cu(II), Mercury (Hg(II) and combination thereof.

2. The nanoparticle composition of claim 1 is prepared using a process consisting of essentially the following steps:
   i) equal volumes of 0.5 molar ferric-nitrate nonahydrate and 0.5 molar Monopotassium phosphate were combined with stirring;
   ii) pH of the combined solutions was immediately adjusted to 3.2 with 4.5 molar Potassium Hydroxide followed by 0.5 molar Potassium Hydroxide;
   iii) aging the suspension for 42 hours at 99 degree Celsius in a dry air oven; and
   iv) washing three times with water to remove salts after aging.

* * * * *